Patented Oct. 13, 1936

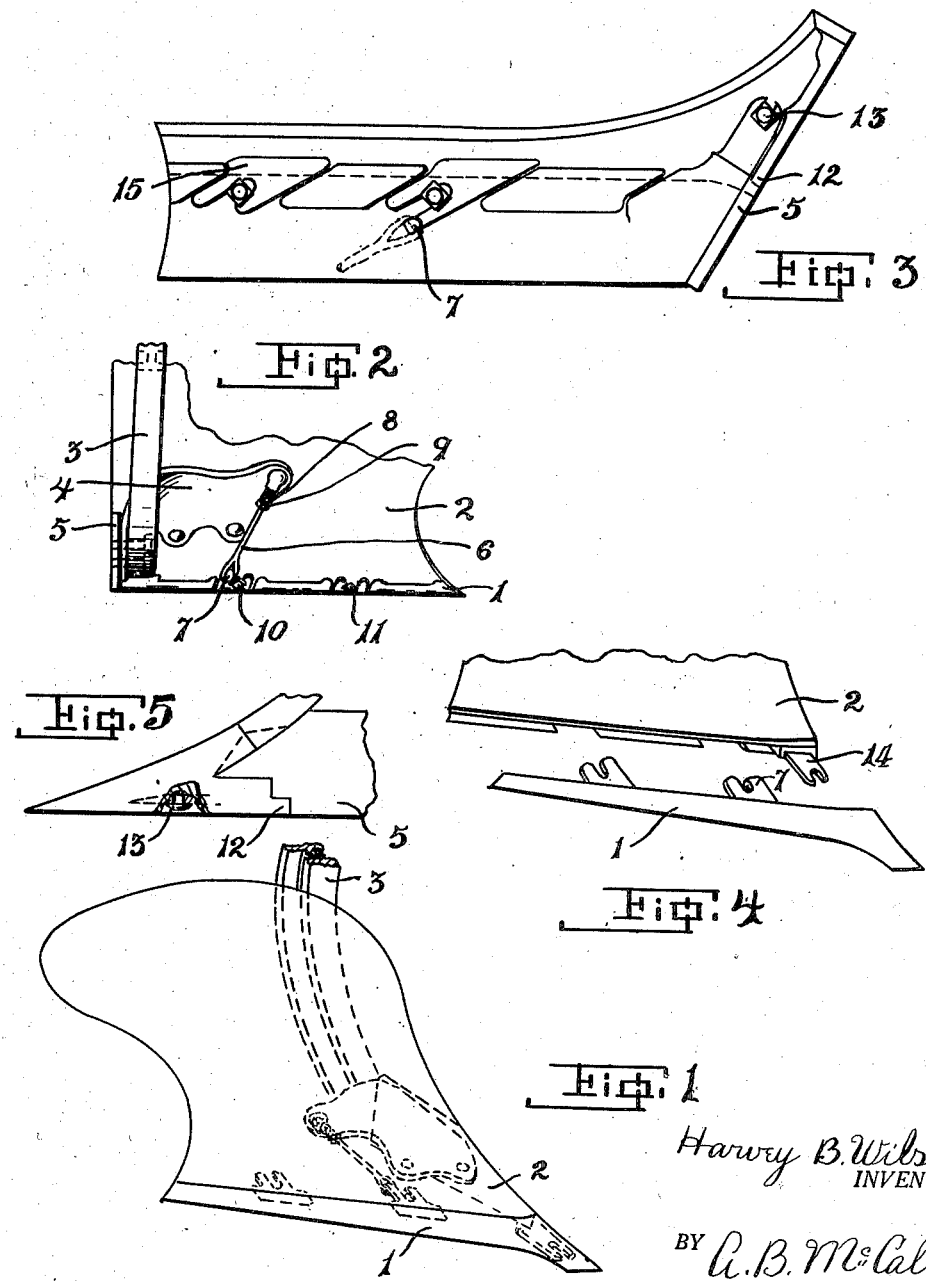

2,057,221

UNITED STATES PATENT OFFICE 2,057,221

PLOW SHEAR

Harvey B. Wilson, Athens, Ill.

Application April 25, 1934, Serial No. 722,241

3 Claims. (Cl. 97—125)

My invention relates to plow shears adapted to be used in connection with a mold board of a plow for cutting soil, on a horizontal plane which forms the bottom and inner edge of a furrow when plowing; an object being in my device to provide a plow shear of relatively small size forming the cutting blade for the plow and to provide in connection therewith a strong and substantial means of detachably securing the same to the mold board and landside plate of a plow to which it is normally attached.

A further object of my invention is to provide as a plow shear a relatively thin detachable cutting blade that may be easily mounted or detached and comparatively inexpensive to make in order that the sharpening of plows may be avoided by replacing the dull blade with a fresh new sharp one at a cost comparing favorably with the cost of sharpening an old blade.

A further object of my invention is to provide in a plow shear a means of quickly and easily detaching or mounting the same when it is desired to exchange blades in order that a great deal of valuable time may be saved by the farmer at a time when it is important to make the hours count in the field.

I attain the objects of my invention in the device described in the annexed specifications, recited in the claims and illustrated in the accompanying drawing in which like reference numerals indicate like parts in the several figures.

Referring to the figures:

Fig. 1 is a perspective of a front view of a plow disclosing to view the plow shear of my invention mounted in operative position.

Fig. 2 is a rear elevation of a portion of a plow showing secured to the mold board thereof the plow shear of my invention.

Fig. 3 is a bottom view of a plow shear such as is now in common use showing detachably secured thereto the detachable cutting blade of my invention and disclosing to view the manner of holding the blade substantially into operative position when in use on a plow.

Fig. 4 is a perspective disclosing to view a front detail of a detached plow shear ready to slip on to a mold board of a plow.

Fig. 5 is a side elevation disclosing the fitting relation of the shearing blade in its operative connection with the landside plate of a plow.

Referring in detail to the structure of my invention, the method of operating the same and the normal function thereof, it will be observed by those who are skilled in the art pertaining to agricultural implements that in this device I provide an arrangement of structural detail in a plow shear adapted to be quickly and conveniently manipulated, economical to manufacture and so designed as to save time and labor in replacement of the same.

In the past when plows were sharpened the plow shear which constituted a good portion of the front part of the lower end of the mold board had to be detached and taken to a blacksmith in order that the cutting edge thereof might be sharpened; which operation required a lot of time and inconvenience to the farmer and usually at a period when lost time means a great deal on the farm.

The experienced farmer therefore will readily recognize the merits of my device when he observes that the novel features thereof are found in a relatively small narrow cutting blade detachably mounted into operative position on the mold board so as to be very substantial when in use and very easily and quickly detached when it gets dull and replaced as quickly by a new blade at a cost not exceeding the cost of having a blacksmith sharpen the old blade; especially when the farmer's time and the inconvenience to him is considered.

The novel features of my device will be found not only in the plow shear or cutting blade of my invention but also in its operative combination with a mold board of a plow and in a study of the details of construction it will be seen that I provide a cutting blade 1 detachably engageable to a plow mold board 2.

When connected up for normal operation mold board 2 is supported by a plow beam 3 through the substantial holding plate 4 which beam also detachably engages a landside plate 5.

When mounted into operative position the detachable shearing blade 1 is slidably and snugly engaged to mold board 2 and landside plate 5 in a manner permitting rod 6 hooked into holding plate 7 and detachably secured to bracing plate 4 to substantially hold shearing blade 1 into working position. Rod 6 is adapted to be optionally adjusted for tension by turning hand screw 8 where rod 6 is held into adjustment by a lock nut 9.

It will be seen that shearing blade 1 is held substantially into operative position by bolts 10 and 11 and shoulder 12 and locking pin 13.

A further means of substantially engaging shearing blade 1 into operative position is by slotted arm 14 forming a part of landside plate 5 and adapted to be engaged by pin 13 when cutting member 1 is in normal operation. Slotted arm 14 fitting in under mold board 2 and extending forward of the front edge thereof has a forward slot which slips over pin 13 on the detachable shearing blade 1.

It may be practical to use only one engaging plate indicated by numeral 7 but I have disclosed more than one in this case for the reason that there may be occasion to use the same. Other engaging plates or holding plates are indicated by numeral 15 as shown in Figure 3.

When it is desired to detach shearing blade 1 hand screw 8 is turned so as to release the tension on slotted plate 7 then by slightly tapping shearing blade 1 it may be pulled straight off forward by the hand.

Having thus described the nature of my invention what I claim is:

1. The combination with a detachable plow shear comprising a relatively narrow blade having slotted holding plates, and a forwardly disposed locking pin, of a mold board having integral flanges forwardly disposed and engaging bolts for detachably securing thereto said shear member forward of the front edge thereof, and a landside plate having an integral slotted member adapted to engage said locking pin of said shear member, said landside plate registering in vertical alignment with the outer edge of said mold board.

2. In a device of the character described the cooperative combination with a detachable plow shear, having integral spaced stop members and integral spaced slotted holding plates and a forwardly disposed lock pin, of a mold board provided at the forward edge thereof with spaced integral flanges and locking bolts, and a landside plate registering in vertical alignment with the outer edge of the mold board and provided with a slotted forward projecting arm for engaging said lock pin of the shear member; one or more of said integral slotted holding plates of said shear member bent into an integral hook at the rear end thereof to provide adjustable engaging means for holding the shear into operating position more substantially; said flanges of said mold board and said shear adapted to cooperate in substantially holding said shear snugly into operative position when in normal use.

3. In a plow the co-operative combination of a mold board having integral slantingly disposed retaining lugs spaced to define parallel slanting grooves, a landside member provided with an integral extension arm having a front terminal slot, a plow shear provided with a lock pin for the engagement of said slotted extension arm of the landside and adapted to snugly, substantially and detachably fit the forward edge of said mold board and provided with slanting extension lugs spaced to slidably fit into said grooves of the mold board; said slanting lugs each slotted and adapted to receive a fixed bolt of said mold board disposed in said grooves thereof respectively and one of said slanting extension lugs of the shear provided with an integral hook, and a detachable retaining rod having a terminal loop for engaging said hook and anchored on the rear surface of said mold board with means for adjusting the length thereof and thus tightening the tension when it engages said hook of the plow shear.

HARVEY B. WILSON.